Jan. 14, 1969  H. GETTER  3,421,726
TIE-DOWN ANCHOR DEVICE
Filed Sept. 18, 1967
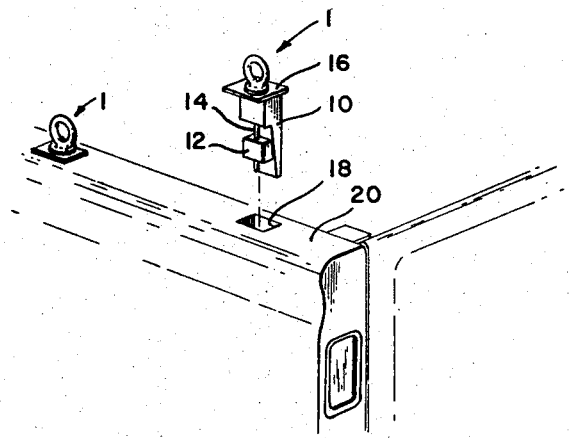
FIG___1
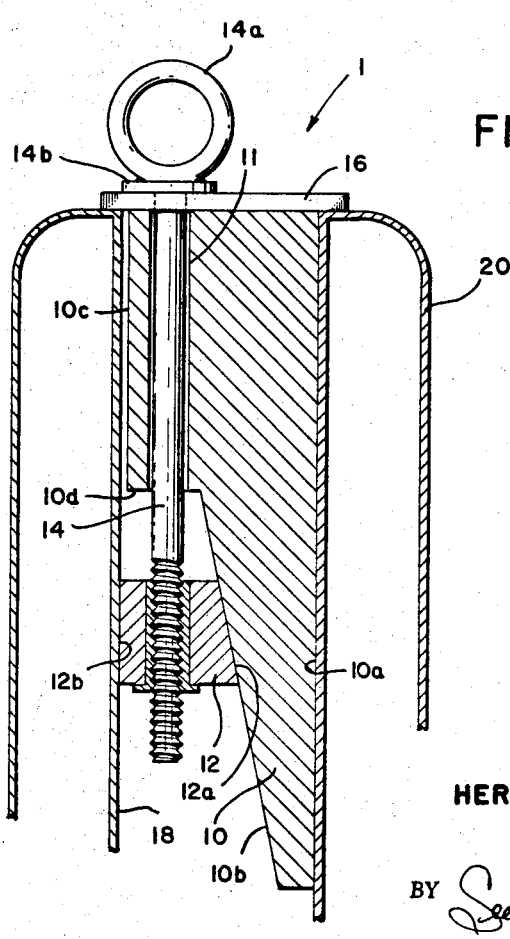
FIG___2
HERBERT GETTER
INVENTOR.
BY *Seed, Berry, Downey*
ATTORNEYS

United States Patent Office 3,421,726
Patented Jan. 14, 1969

3,421,726
TIE-DOWN ANCHOR DEVICE
Herbert Getter, 14640 3rd SW., Seattle, Wash. 98166
Filed Sept. 18, 1967, Ser. No. 668,524
U.S. Cl. 248—361                                    9 Claims
Int. Cl. A62b 35/00; B61d 45/00

ABSTRACT OF THE DISCLOSURE

An anchor device employs cooperating wedges to secure itself into a straight-sided opening such as a pickup body stake hole for use as a tie-down anchor point.

---

In brief, this invention is a device for use in securing loads to truck beds, pickup bodies, railroad flat cars, cargo pallets, and the like, that are provided with suitable elongated openings into which the device can be inserted. The device comprises a pair of wedge members having parallel inclined inner or adjacent sides and outer sides that conform to the configuration of the opening walls, and a threaded rod that slidably extends through one member and threads into the other such that by turning the rod, the second member is wedged upward against the first member thereby forcing the two members against the opposing adjacent walls of the opening. The top of the rod is provided with an eye or other suitable tie-down connector.

In the drawings

FIG. 1 depicts in perspective a section of the side of the bed of a pickup truck with the device of this invention ready for insertion into a side stake hole; and FIG. 2 shows the device inserted into and wedged against the walls of the stake hole opening.

The tie-down anchor device 1 of this invention comprises a main wedge member 10, a secondary wedge member 12, an eyed anchor bolt 14, and a bearing plate 16. The device is constructed to slidingly fit into a suitable opening such as a stake hole 18 formed in a truck bed or a pickup body 20, and to be wedged thereinto to provide a tie down.

The main wedge member 10 has a stepped configuration in vertical elevation as shown in FIG. 2 providing a flat side 10a and an opposite side having an upwardly-inclined lower section 10b, an upper section 10c parallel to the opposite side 10a and spaced outwardly of the upper end of the lower section 10b, and an intermediate section 10d normal to the upper section 10c interconnecting the upper section 10c and the lower section 10b. The width of the top portion of member 10 is slightly less than the width of the opening into which it is designed to be inserted. The flat bearing plate 16 is rigidly attached to the top of member 10 and is of sufficient width to span the walls of the opening to support the member 10 therein as shown in FIG. 2.

The eyed anchor bolt 14 is slidably and loosely inserted into a bore 11 through the top portion of member 10 and extends below the intermediate side section 10d as shown. The secondary wedge member 12, threaded onto the lower threaded section of bolt 14, is provided with a downwardly inclined side 12a parallel to the lower side section 10b of member 10, and with an opposing side 12b parallel to the side 10a of member 10.

The eye 14a of bolt 14 is provided with a flange 14b that seats on bearing plate 16 and bears thereagainst when the device 1 is wedged into its opening. There is sufficient "play" between the shank of bolt 14 and the bore 11 so that the device can be easily inserted in and removed from its opening when the member 12 is threaded down on the bolt 14. Once the device is inserted into its opening with the bearing plate 16 resting on the rim of its opening, the eyed bolt 14 is turned to thread the member 12 upwardly thereby bringing the mating inclined surfaces of the members 10 and 12 together. As member 12 continues to be threaded upward, member 10 will be shifted outward until its side 10a firmly contacts the adjacent side of the opening and until the side 12b of member 12 firmly contacts the opposite side of the opening. At this point the device will be firmly wedged into the opening. Any force now exerted on the eyed bolt, such as by anchoring down a load thereto, will reinforce the wedging effect and even more firmly wedge the device into its opening.

As seen in FIG. 1, the device is preferably inserted into its opening in such a manner that any lateral loading of the eye 14a will tend to urge it toward the straight side 10a of member 10. This will cause the member 10 to be urged outward and the member 12 to be urged outward also, thereby reinforcing the wedging effect. Normally, this preferred orientation of the device would result in the member 10 being inboard of the member 12 in relation to the load as shown in FIG. 1.

The components of the device may be fabricated from any suitable material such as metal, plastic or wood, the selection of material being dictated by the loads to be resisted. In place of the eye 14a, a clevis, hook or other form of anchor connector may be employed if desired.

It is believed that the invention will have been clearly understood from the foregoing detailed description of my now-preferred illustrated embodiment. Changes in the details of construction may be resorted to without departing from the spirit of the invention, and it is accordingly my intention that no limitations be implied and that the hereto annexed claims be given the broadest interpretation to which the employed language fairly admits.

The embodiments of the invention in which an exclusive property or privilege is claimed are defined as follows:

1. A tie down device for insertion into an elongated opening which comprises a first wedge member having an upwardly inclined inner side and an outer side conforming to the configuration of the opening; a second wedge member having an inclined inner side parallel to the first member inclined side and an outer side conforming to the configuration of the opening; and a threaded rod extending loosely through said first member and threaded into said second member such that said rod can be turned to bring the wedge member inclined sides together to force the member outer sides outwardly into binding contact with the opening side walls, said rod being provided with a tie-down connector at its outer end.

2. The device of claim 1 wherein the upper section of said first member is enlarged and wherein said rod extends through such enlarged section.

3. The device of claim 1 wherein said tie-down connector comprises an eye formed in the outer end of said rod.

4. The device of claim 1 wherein said first member is provided with its inclined inner side in a lower section thereof and is provided with an enlarged upper section through which said rod loosely extends non-axially of such inclined side.

5. The device of claim 1 including a bearing plate rigidly attached to the top of said first member to support the device from the rim of the opening.

6. In combination, a load-carrying device on which a load is to be secured having a plurality of peripheral elongated openings therein; and a plurality of tie-down devices inserted in such openings, each device comprising a first wedge member having an upwardly inclined inner side and an outer side conforming to the configuration of the opening, a second wedge member having an inclined inner side parallel to the first member inclined side and an outer side conforming to the configuration of the opening, and a threaded rod extending loosely through said first member and threaded into said second member such that said rod can be turned to bring the wedge member inclined sides together to force the member outer sides outwardly into binding contact with the opening side walls, said rod being provided with a tie-down connector at its outer end.

7. The device of claim 6 wherein said first member is provided with its inclined inner side in a lower section thereof and is provided with an enlarged upper section through which said rod loosely extends non-axially of such inclined side.

8. The device of claim 6 including a bearing plate rigidly attached to the top of said first member to support the device from the rim of the opening.

9. The device of claim 6 wherein each of said first members is oriented inboard of said second member.

References Cited

UNITED STATES PATENTS

| | | | |
|---|---|---|---|
| 3,102,708 | 9/1963 | Crain | 248—361 |
| 3,252,681 | 5/1966 | Watts | 248—361 |
| 3,298,652 | 1/1967 | Burdick | 248—361 |
| 3,343,503 | 9/1967 | Johnson | 105—369 |

JOHN PETO, *Primary Examiner.*

U.S. Cl. X.R.

105—369